United States Patent [19]
Cullen et al.

[11] Patent Number: 5,805,722
[45] Date of Patent: Sep. 8, 1998

[54] METHOD AND APPARATUS FOR LOCATING, INSPECTING, AND PLACING LARGE LEADED DEVICES

[75] Inventors: Christopher P. Cullen, Ipswich; Antonie J. Engel, Bolton, both of Mass.

[73] Assignee: Cognex Corporation, Natick, Mass.

[21] Appl. No.: 726,402

[22] Filed: Oct. 2, 1996

Related U.S. Application Data

[63] Continuation of Ser. No. 155,742, Nov. 22, 1993, abandoned.

[51] Int. Cl.$^6$ ...................................................... G06K 9/00
[52] U.S. Cl. .............................................. 382/146; 382/168
[58] Field of Search .................................... 364/570, 559, 364/490; 348/126, 87; 356/380, 383, 394; 382/141, 146, 151, 199, 144, 145, 147, 148, 149, 150, 168, 173, 181, 190, 209, 224, 143, 152, 169, 170, 171, 172, 192, 203, 204, 205, 217

[56] References Cited

U.S. PATENT DOCUMENTS

| | | | |
|---|---|---|---|
| 3,968,475 | 7/1976 | McMahon | 382/18 |
| 3,996,800 | 12/1976 | Rosso | 382/18 |
| 4,200,861 | 4/1980 | Hubach et al. | 382/34 |
| 4,254,400 | 3/1981 | Yoda et al. | 382/18 |
| 4,441,206 | 4/1984 | Kuniyashi et al. | 382/8 |
| 4,630,306 | 12/1986 | West et al. | 382/8 |
| 4,696,047 | 9/1987 | Christian et al. | 382/146 |
| 4,736,437 | 4/1988 | Sacks et al. | 382/34 |
| 4,783,828 | 11/1988 | Sadjadi | 382/21 |
| 4,847,911 | 7/1989 | Morimoto et al. | 382/146 |
| 4,907,169 | 3/1990 | Lovoi | 382/8 X |
| 5,371,690 | 12/1994 | Engel et al. | 364/570 |

*Primary Examiner*—Leo Boudreau
*Assistant Examiner*—Bijan Tadayon
*Attorney, Agent, or Firm*—Maureen Stretch

[57] ABSTRACT

In a machine vision system capable of capturing an optical image of a semiconductor electronic component part and digitizing the optical image, a method for locating, inspecting and placing parts known as large leaded devices, by estimating a part's location; estimating the approximate location of a group of leads; computing the center and angle of a lead scan search rectangle within which the leads in a group of leads must be located; scanning a lead scan search rectangle to locate lead edges and compile a list of edges; extracting lead positions; updating the part location estimate; and repeating these steps for each lead set to find all leads and lead centerlines; then calculating an optimal part position estimate by matching found lead positions with expected lead centerlines; and finally, inspecting the leads. A statistical lead rejection procedure is included during lead extraction.

14 Claims, 21 Drawing Sheets

| Name | Type, Units | Explanation |
|---|---|---|
| The following are parameters for the device as a whole: | | |
| Part Type | Integer | The type of device to be described. Current device types are:<br><br>1    PLCC<br>2    QFP<br>3    SOIC |
| Version | Integer | Version number of the device description. The version number changes when new parameters are added or deleted. This enables the latest software to incorporate old device descriptions. |
| Length Units | Integer | The unit of length used for the device description dimensions and coordinates. Typical length unit choices are:<br>0 Microns<br>1 Microinches |
| Body Center, R* | Integer, Length units | The R (radial) coordinate of the device body location. |
| Body Center, T* | Integer, Length units | The T (tangential) coordinate of the device body location. |
| Body Angle* | Double, Degree | The angle of the device body. |
| Body R size* | Integer, Length units | The length of the body rectangle along the body coordinate frame's R axis. |
| Body T size* | Integer, Length units | The length of the body rectangle along the body coordinate frame's T axis. |
| Number of Parameters | Integer | The number of blocks of lead parameter data in this device description. The number of blocks of parameter data provided must match this number exactly. |
| Number of Elements | Integer | The number of blocks of lead element data in this device description (i.e. the number of lead sets). The number of blocks of element data provided must match this number exactly. |

Fig. 7a

| The following parameters are supplied for each group: | | |
|---|---|---|
| Width | 3 Integers, Length units | The width of each lead in the lead set. This is supplied as a triplet of numbers: minimum, nominal, maximum. |
| Length | 3 Integers, Length units | The length of each lead in the lead set. This is supplied as a triplet of numbers: minimum, nominal, maximum |
| Pitch | 3 Integers, Length units | The pitch of the lead set, i.e. the distance between lead centers. This is supplied as a triplet of numbers: minimum, nominal, maximum |
| Foot Length | 3 Integers, Length units | The length of each lead foot in the lead set. The lead foot is the length of the portion of the lead that contacts the board surface. This is supplied as a triplet of numbers: minimum, nominal, maximum |
| R Tolerance* | Integer, Length units | Maximum allowable deviation between the observed lead and the model lead, in the R direction. Set this to zero to disable R tolerance checking. |
| T Tolerance | Integer, Length units | Maximum allowable deviation between the observed lead and the model lead, in the T direction. Set this to zero to disable T tolerance checking. |
| The following parameters are supplied for each lead group elment: | | |
| Angle | Double, Degrees | The angle of the lead set. |
| R | Integer, Length units | The R (radial) coordinate of the lead set. |
| T | Integer, Length units | The T (tangential) coordinate of the lead set. |
| Number of Leads | Integer | The number of leads in the lead set. |
| Parameter Index | Integer | The index of the parameter block that describes the leads' dimensions and tolerances. Zero references the first block, 1 the second, and so on. |

Fig. 7b

High-Level LL Algorithm Parameters

| Name | Type, Units | Explanation |
|---|---|---|
| Backlit | Integer | The type of lighting used for the inspection:<br>0 Frontlight (light leads against a dark background)<br>1 Backlight (dark leads and body against a light background). |
| Uncertainty Margin | Integer, Length units | Specifies the amount of the presentation uncertainty. The rectangle that encloses the device leads is padded by the uncertainty margin on all four sides to form the presentation bounding box. The device is expected to fall within this bounding box for all inspections. |

Fig. 8

| Name | Type, Units | Explanation |
|---|---|---|
| The following section of parameters is repeated as a block, once for each device description parameter block. The index for each lead set element is used to refer to this block ||||
| The following parameters control the action of the lead extraction algorithm ||||
| Min Lead Width | Double, Length units | The minimum distance two edges can be separated and still be used to form a lead. Recommended value: slightly less than the minimum lead width in the device description. |
| Max Lead Width | Double, Length units | The maximum distance two edges can be separated and still be used to form a lead pitch |
| The following parameters control the action of lead scanning ||||
| Max Scans | Integer | The maximum number of stepped scans that will be used to cover a lead set search rectangle. If more are required, a single rotated scan is used instead. Recommended value: Normally 4. More than 4 often results in lower performance on highly rotated parts. Use 1 if the search rectangle is much narrower than it is wide. Stepped scans can rarely be applied in such cases, and this saves memory. |

Fig. 9a

| | | |
|---|---|---|
| Scan Contrast Threshold | Double, Percentage | The contrast threshold for the lead scan calipers. Edges which fall below this threshold are ignored. Specified as the percentage of maximum possible contrast. Recommended value:<br>• Backlight: 8.<br>• Frontlight PLCC: 4. Front light usually has lower contrast than backlight, but the device body that shows behind the leads is normally dark.<br>• Frontlight QFP: 2. An uncontrolled bright background sometimes shows through from behind the leads, producing very low contrast edges. |
| Rotated Scan Caliper Width | Double, Length units or Fraction | The width of the backup rotated lead scan caliper. This caliper is applied if the first attempt to scan the leads fails, or if the suppress first scan parameter is non zero. The width is specified in two ways, depending on its value:<br>> 0 Absolute width in length units<br>< 0 Fraction of the actual search rectangle width. For example, -0.75 causes the caliper to be 75% of the width of the search rectangle.<br>Recommended value: -1 |
| Set Width | 3 Integers, Length units | The width of the portion of the lead set to scan. Specified as a triplet of numbers, nominal, minimum, and maximum. The minimum set width is used to set the basis search rectangle width.<br>Recommended value: the same as the three foot-length parameters. |

Fig. 9b

| Suppress First Scan | Integer | Specifies whether to skip the first, faster lead scan. Options: 0 Perform the fast lead scan first. Note that if a rotated caliper is used for the first scan (because the number of stepped scans exceeds the max scans parameter), its width is not controlled by the rotated scan caliper width parameter. The width for all fast lead scan calipers is one-third the nominal search rectangle width, adjusted upwards to be an odd number of integer pixels. 1 Perform only the backup rotated lead scan. Recommended value: 0, unless in one of the following situations: • The resolution of the image is very low. For example, if the search rectangle width produces a scan caliper 1 pixel wide, and edge contrast is low. • The intensity and contrast of the lead edges drops near the sides of the search rectangle. This sometimes happens with PLCC devices under frontlight. A rotated caliper is placed down the center of the search rectangle, avoiding this problem. |
|---|---|---|

Fig. 9c

| The following parameters control the action of lead set location independent of the actual location algorithm . |||
|---|---|---|
| Locate Algorithm | Integer | Specifies the sequence of lead set locating algorithms to use in finding lead tip and base edges. The algorithm identifiers are:<br>1 Caliper-based location.<br>2 Intensity-based location.<br>The sequence is specified by forming an integer using a single hex digit for each algorithm desired. The sequence is read right-to-left. For example, to try intensity first, then calipers, then calipers once more, specify 0x112.<br>Recommended value:<br>• Frontlight: 0x12. The intensity-based algorithm is more reliable under most frontlight conditions. The caliper algorithm makes a good backup for the occasional failure.<br>• Backlight: 0x1. The caliper-based algorithm is the only one available for backlight. |

Fig. 9d

| Rectangle Width Basis | Integer | Specifies the method for setting the search rectangle basis width. Options:<br>0 Use nominal width.<br>1 Use measured width. If two locating windows were used, the measured width is the minimum of the two measured widths.<br>-1 Use the minimum of the nominal and measured width.<br>If the measured width is required (any non zero option), and if using the caliper algorithm, the locate with pairs parameter must be non zero.<br>Recommended value:<br>• Backlight: 1. The measured width is usually reliable.<br>• Frontlight PLCC: -1. The bright part of J-leads often become very small at low light levels. Scan only across the bright portion of the leads.<br>• Frontlight QFP/SOIC: 0. The inner (base) edge is often unreliable and so, therefore, is the width. Setting this value also speeds the intensity location algorithm by avoiding the search for the inner edge. |
|---|---|---|
| Rectangle Location Type | Integer | Specifies how to locate the basis search rectangle with respect to lead tip and base edges. Options:<br>0 Center the search rectangle halfway between the edges.<br>1 Align the search rectangle's outer edge with the lead tip edge.<br>-1 Align the search rectangle's inner edge with the lead base edge.<br>Recommended value:<br>• QFP/SOIC: 1. The lead tip is where the lead meets the pad, and is the critical portion to measure. Also avoids edges at the lead bends and body edge.<br>• PLCC: -1. The location of the outer lead tip edge is unreliable. It can be produced by the J portion of the lead (desired), as well as the body edge and outer portion of the lead (not desired). |

Fig. 9e

| Lead to Location Offset | Double, Length units | The radial offset from the center of the lead to the center of the locating window. Used to place the locating window at the midpoint of the edges it will use for coarse location. Recommended value:<br>• Backlight: zero.<br>• Frontlight QFP: Half the difference between the nominal lead length and nominal foot length. The locating window finds the foot edges, not the lead edge closest to the body.<br>• Frontlight PLCC: zero. |
|---|---|---|
| Location to Scan Offset | Double, Length units | The offset from the center of the locating window to the center of the basis search rectangle. These windows have different centers if the locator finds edges that are outside the search rectangle. Recommended value:<br>• Backlight: Half the difference between the nominal lead length and nominal foot length.<br>Lead scanning covers only the lead foot, the portion contacting the board. This avoids using the part of the lead closest to the body edge in locating the lead.<br>• Frontlight QFP: zero.<br>• Frontlight PLCC: zero. |

Fig. 9f

| | | |
|---|---|---|
| Set Location Width | 3 Integers, Length units | The width of the portion of the lead set to use for coarse location. Specified as a triplet of numbers, nominal, minimum, and maximum. The nominal width is used to set the expected caliper pair width. The minimum and maximum widths are used to check edge separation for both location algorithms. Recommended value:<br>• Backlight: the same as the three lead length parameters.<br>• Frontlight QFP: the same as the three foot length parameters.<br>• Frontlight PLCC: set the minimum to 0.8 times the minimum foot length, the nominal to nominal foot length, the maximum to 1.25 times the maximum foot length. The length of the bright portion of PLCC leads can vary greatly as illumination intensity changes. |
| Rectangle Tip Offset | Double, Length units | The amount to shrink the basis search rectangle at the lead tip to obtain the final search rectangle.<br>Recommended value: If resolution is very low, zero; otherwise, the length of one pixel. |
| Rectangle Base Offset | Double, Length units | The amount to shrink the basis search rectangle at the lead base to obtain the final search rectangle.<br>Recommended value:<br>If resolution is very low, zero; otherwise, the length of one pixel. |

Fig. 9g

| | | |
|---|---|---|
| The following parameters control the action of the caliper-based lead set location algorithm. | | |
| Edge 1 Polarity | Integer | Sets the polarity of the first edge of the locating caliper. Note that the search direction of locating calipers is along the positive radial axis of the lead set coordinate frame . Options:<br>-1 Negative. Light to dark transition.<br>1 Positive. Dark to light transition.<br>0 Any. Either polarity will be considered.<br>Recommended value: See edge 2 polarity. |
| Edge 2 Polarity | Integer | Sets the polarity of the second edge of the locating caliper. Options are the same as for edge 1 polarity.<br>Recornmended values for edge 1 and 2 polarities:<br>• Backlight: 1,1.<br>• Frontlight QFP: 1, -1.<br>• Frontlight PLCC: 1, 0. The projection sums a positive transition at the body edge with a negative transition at the lead tip, leaving unreliable edges of varying polarity in the region of the outer lead edge. |
| Locate Contrast Threshold | Double, Percentage | The contrast threshold for the locating calipers. Edges which fall below this threshold are ignored. Specified as the percentage of maximum possible contrast. Recommended value:<br>• Backlight: 5.<br>• Frontlight: 2. |

Fig. 9h

| | | |
|---|---|---|
| Locate Caliper Width | Double, Length units | The width of the locating caliper window Recommended value:<br>• For lead sets with many leads (e.g. 16 or more), twice the lead pitch plus the lead width. Guarantees that at least two leads will show in the window, for robustness.<br>• Otherwise, one times the lead pitch plus 1.5 times the lead width. This guarantees catching at least one lead, even if bent. A wider caliper will often prevent the application of two locating calipers on a lead set with typical uncertainty. This then prevents acquiring an angle estimate. |
| Max Caliper Filter Length | Integer, Pixels | The maximum length of the caliper's filter. The filter length is set to half the expected pair width (nominal lead length for backlight, nominal foot length for frontlight). If the maximum filter length is exceeded, that length is used instead. Recommended value: 7 pixels. |
| Position Factor | Double | An absolute position constraint can be added to locating caliper grading. This can be set to favor edge pairs that are closer to the body center, or farther away. The absolute value of this factor sets the importance of position relative to the other constraints, contrast and pair size. Options:<br>0 Turns off the position constraint.<br>< 0 Favors edge pairs at the end of the search window (lead tips)<br>> 0 Favors edge pairs at the beginning of the search window (lead base)<br>Recommended value:<br>• Frontlight: 0. If there are confusing edges, try using the intensity locator first, by changing the value of the locate algorithm parameter. If not possible, try 0.05 to favor inner edges, avoiding lead tip confusion, or -0.05 to favor outer edges, avoiding body confusion (e.g. printing).<br>• Backlight: -0.05. Favors outer edges. |

Fig. 9i

| The following parameters control the intensity-based lead set location algorithm || |
|---|---|---|
| This algorithm only works for frontlight images. || |
| Locate Window Width | Double, Length units | The width of the intensity locator window<br>Recommended value:<br>• For lead sets with many leads (e.g. 16 or more), twice the lead pitch plus the lead width. Guarantees that at least two leads will show in the window, for robustness.<br>• Otherwise, one times the lead pitch plus 1.5 times the lead width. This guarantees catching at least one lead, even if bent. A wider window will often prevent the application of two locating windows on a lead set with typical uncertainty. This then prevents acquiring an angle estimate. |
| Noise Filter Length | Integer, Pixels | The minimum number of consecutive pixels above the intensity threshold along the search direction that constitutes a lead.<br>Options:<br>0 Computed during inspection as 1/4 of the minimum foot length.<br>> 0 Sets the filter length to this number.<br>< 0 Sets the minimum filter length. The length is computed as for option 0, but that length is limited to the absolute value of this parameter.<br>Recommended value:<br>• For low-resolution images (e.g. minimum foot length is less than 8 pixels): -2.<br>• Otherwise, -3. |

Fig. 9j

| Intensity Pad | Integer | Specifies the amount to lower the intensity threshold below that computed by the image histogram tails computation. Padding the threshold makes the lead area grow. This produces a wider search rectangle, making more lead edge available for measurement. Too much padding will include non-lead edges in the location, producing incorrect search rectangle location. Recommended value: 2. When the light intensity is consistent and the background free of bright regions, this could be increased to 10. |
|---|---|---|
| Area Fraction | Double, Fraction | The fraction of the nominal lead area (minimum foot length times nominal lead width) to use in computing the number of pixels at which the intensity threshold is set. Set less than one to be conservative, for example dim lighting might result in fewer bright lead pixels. Recommended value: 0.5. Increase this only if the lighting intensity and part illumination (e.g. even mixture of on and off-axis light) is very consistent. |

Fig. 9k

LEAD EXTRACTION EDGE MATCHING

METHOD AND APPARATUS FOR LOCATING, INSPECTING, AND PLACING LARGE LEADED DEVICES

This application is a continuation of application Ser. No. 08/155,742, filed on Nov. 22, 1993, now abandoned.

BACKGROUND OF THE INVENTION

In a typical automated system for the placement of surface mounted semiconductor devices onto a printed circuit board, machine vision systems capable of optically sensing images of the devices and digitizing those images are used to locate fiducials or targets on the printed circuit boards for alignment, find and inspect the surface mounted devices, and issue accept or reject decisions. These machine vision systems are often included in or operate as part of the mounting machine.

For device location, inspection and placement, a mounter typically picks a device from a waffle pack, tape, or other source and holds it over one or more device inspection cameras. A machine vision system captures a grey scale image of the device, digitizes the image, and then locates and examines each lead in the digitized image, one at a time, to ensure that devices with slightly deformed leads are detected so they can be placed correctly and that those with broken, missing, or severely bent leads are rejected.

A preliminary device location step may take place to determine the approximate location of the device within the image. In one location scheme, locating windows are placed over those regions in the image where the device is expected to appear. The vision system then analyzes the data within those windows to detect changes in grey levels. These grey-level variations represent the edge of the device's body and the tips of the leads. Using this data, or similarly acquired data, a vision system can calculate an exact device position.

Once the exact position of a device is known, the location of each lead is calculated, one at a time, so that each lead can be inspected. Typically, each lead is located by reference to the exact position of the device. Once all the leads are located, the vision system can calculate the optimum position for device placement on the printed circuit board and appropriately signal such information to a manipulator within the mounter for appropriate action. If a device cannot be properly placed on the board, the vision system sends a reject signal to a manipulator within the mounter.

For devices with a small number of leads, this process has been adequate. However, as the number of leads on a device increases, it takes a typical vision system a longer time to perform the location and inspection steps, if the increased number of leads can only be located in reference to an exact part location and each lead is located one at a time.

In a manufacturing assembly process, any such increase in assembly time is costly. However, efforts to decrease assembly time must avoid decreasing accuracy, reliability or the general robustness of the process.

Additionally, efforts to improve processing time must also be effective in a variety of lighting conditions and also able to deal with significant variations in lead layout and type.

SUMMARY OF THE INVENTION

The invention provides a method and apparatus for locating, inspecting and placing large leaded devices. In a preferred embodiment of the invention, the leads are found in sets by estimating the approximate location of a group or set of leads; computing the center and angle of a lead scan search rectangle within which the leads in a set of leads must be located; scanning a lead scan search rectangle to locate lead edges and compile a list of edges; extracting lead positions, using a statistical lead rejection procedure for defective leads at the ends of a set; updating the part location estimate; and repeating these steps for each lead set to find all leads and lead centerlines. Once the leads have been located according to the method and application of the present invention, the apparatus calculates an optimal part position estimate by matching found lead positions with expected lead centerlines; and, finally, the leads are inspected.

Any of a number of leaded device types can be handled. It is an object of the present invention to improve the speed and reliability of the location of the entire leaded part. Devices with few leads can be found more quickly and reliably according to the method and apparatus of the present invention while the speed and reliability of locating large leaded devices is significantly improved. For purposes of illustration, and not by way of limitation, two general types of large leaded devices are discussed herein. For example, a preferred embodiment of the invention works with large leaded devices called J-lead devices or PLCC or SOJ's, among other appellations. A preferred embodiment of the invention also works with "gullwing" leaded devices, also known as QFP or SOIC devices.

In a preferred embodiment of the invention device information can be derived and stored in a device description. In a preferred embodiment of the invention, a training step is used to create information about a new device. It is an object of the invention that the information about a device which is gathered in this way can be done at a high-level, in which case, the user supplies less detail about the device and the method and apparatus of the present invention calculates the details from a good model, or the information can be supplied at a low-level. In the latter case, the user supplies much of the descriptive device detail to the system.

It is also an object of the invention to locate, inspect and place large leaded devices whether they are front lit or back lit.

In a preferred embodiment of the invention, a first step includes coarsely locating the first group of leads.

According to the method and apparatus of the present invention, two approaches can be used for coarse location of lead groups, one using pixel intensity processing, the other using a machine vision system tool known as calipers.

In a preferred embodiment of the invention, a first coarse location attempt to find frontlighted images of lead groups uses an intensity-based method. A grey scale image which has been captured and digitized by the machine vision system is searched for the edges of the leads.

In a preferred embodiment of the invention a caliper-like machine vision tool can also be used for coarse lead set location.

Coarse location of a lead set produces at least two resulting edges that are used in a preferred embodiment of the invention to compute the center and angle of a lead scan search rectangle, within which all the leads in the set must fall.

It is an object of the invention to offer two types of lead scans: narrow rotated and stepped. A stepped scan consists of several calipers aligned with the image that cover the lead scan search rectangle. This type of scan is very fast. A narrow rotated scan is slower but more reliable.

In a preferred embodiment of the invention, the lead edges found from a lead scan are merged into a single edge list for the subsequent lead extraction phase. There are often extra spurious edges found.

If the lead extraction phase found the expected number of leads in a lead set, a part position estimate is updated, based on the found lead positions. This is still a coarse estimate, but usually much better than the initial one.

It is yet another object of the invention that an updated position estimate makes subsequent lead set location operations more reliable and faster, by shrinking the search windows and lead scan search rectangles, and locating closer to the ends of the lead sets. These basic steps are repeated for each lead set.

After all the leads have been successfully found, the locations are fit to the corresponding lead centerlines using a least-squares method. A conventional bent-lead check is then performed, checking the distance between each found lead and its corresponding centerline, to be within the lead tangential tolerance.

It is yet another object of this invention to reject spurious leads within a bank of leads. A double pitch check, which checks the pitch of two leads, is used to achieve this objective.

In frontlighted images, sometimes too many leads or a large number of low-quality, low-contrast edges may be found. Sometimes there are edges that are perfectly spaced and high-contrast, but they do not, in fact, represent leads. Typically, these are from bumper corner edges, internal pockets, and so on.

It is much harder to reject spurious leads such as these which are at one end of a lead set than it is to reject spurious leads in the middle of a set. If, at the end of lead extraction, there are more leads found than expected, another feature of the invention attempts to cull out spurious ones.

In a preferred embodiment of the invention, rejection of spurious leads at the end of a lead set is achieved by collecting statistics on the properties of the lead set as a whole, heavily favoring leads in the middle. All leads are then assigned a grade that indicates how "typical" that lead is. The grades are histogrammed and the histogram is analyzed. If there are n too many leads in a lead set, the method and apparatus of the present invention checks to see if the n worst grades are significantly worse than the rest. If they are, the method and apparatus of the current invention checks whether those leads are also on the ends of the set. If that is true also, the method and apparatus of the present invention presumes that they are spurious leads, and eliminates them.

BRIEF DESCRIPTION OF THE DRAWINGS

FIG. 7 depicts a table of device description parameters.

FIG. 8 depicts a table of high-level parameters.

FIG. 9 depicts a table of low-level parameters.

DETAILED DESCRIPTION OF THE INVENTION

Figure 1:
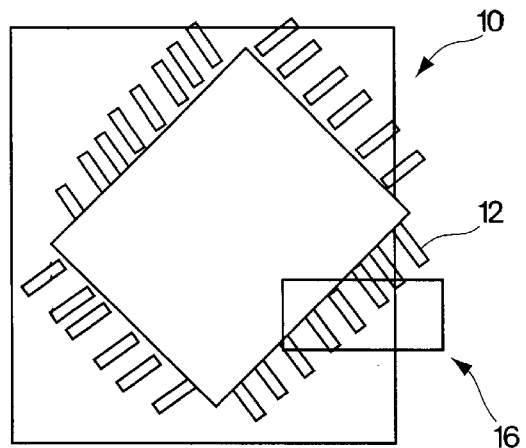
FIG. 1 depicts a digitized image of a large leaded device.

FIG. 1, depicts a top view of a digitized image of a front-lit large leaded device, 10 commonly called a quad pack. As can be seen, the device is not aligned as might be desired, but is skewed to the right.

In a preferred embodiment of the invention, a first processing step includes coarsely locating a first group of leads, in this case the right-hand group 12. Two locating windows are placed over regions that must cross the lead set, given the expected uncertainty in part location. A first window, 16 is shown outlined in FIG. 1.

According to the method and apparatus of the present invention these windows are used to locate either or both of the lead tip and lead base edges. For a QFP device, the apparatus and method locates only the lead tips.

In a preferred embodiment of the invention two methods can be used for coarse location of a lead set: one using pixel intensity processing, the other using a commercially available tool called calipers.

The first coarse location attempt for frontlit images uses a pixel intensity-based algorithm. The digitized, binary image is searched for the edges of the leads.

Figure 2:
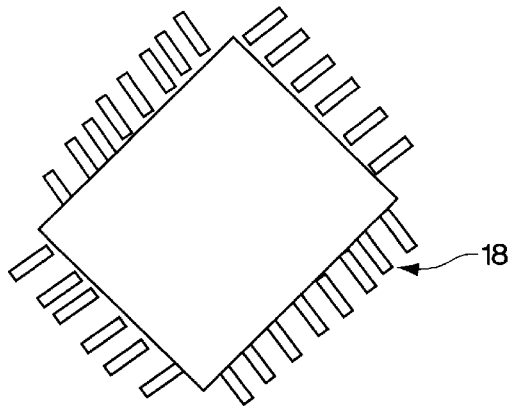
FIG. 2 depicts a digitized image of large leaded device, with an indicator showing at least one lead tip edge located.

FIG. 2 shows a lead tip that has been located.

According to the method and apparatus of the present invention a caliper tool or similar procedure can also be used for coarse lead set location. A caliper tool used in a preferred embodiment is a machine vision system tool modeled after a mechanical caliper. A user of the machine vision system specifies to the system the desired separation between the caliper "jaws", or the approximate distance between the edge pairs of interest. The machine vision system caliper tool then searches within a region of interest or search window for the pair of parallel edges that match that description and precisely measures the actual distance between them.

Figure 3:
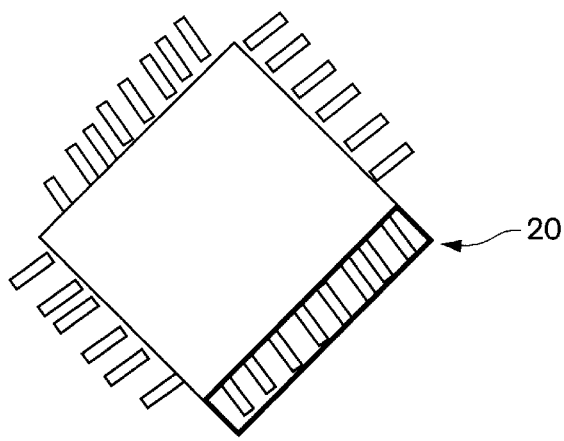
FIG. 3 depicts a digitized image of a large leaded device including a lead search scan rectangle drawn over a set of leads.

In FIG. 2, the found location of a lead tip edge 18 is indicated by an arrow. A second search window is then applied below that lead tip edge to the same lead set. The two resulting edges are used to compute the center and angle of a lead scan search rectangle, within which the leads in the set must fall, given the present location uncertainty. FIG. 3 shows a lead scan search rectangle so computed.

Figure 4:
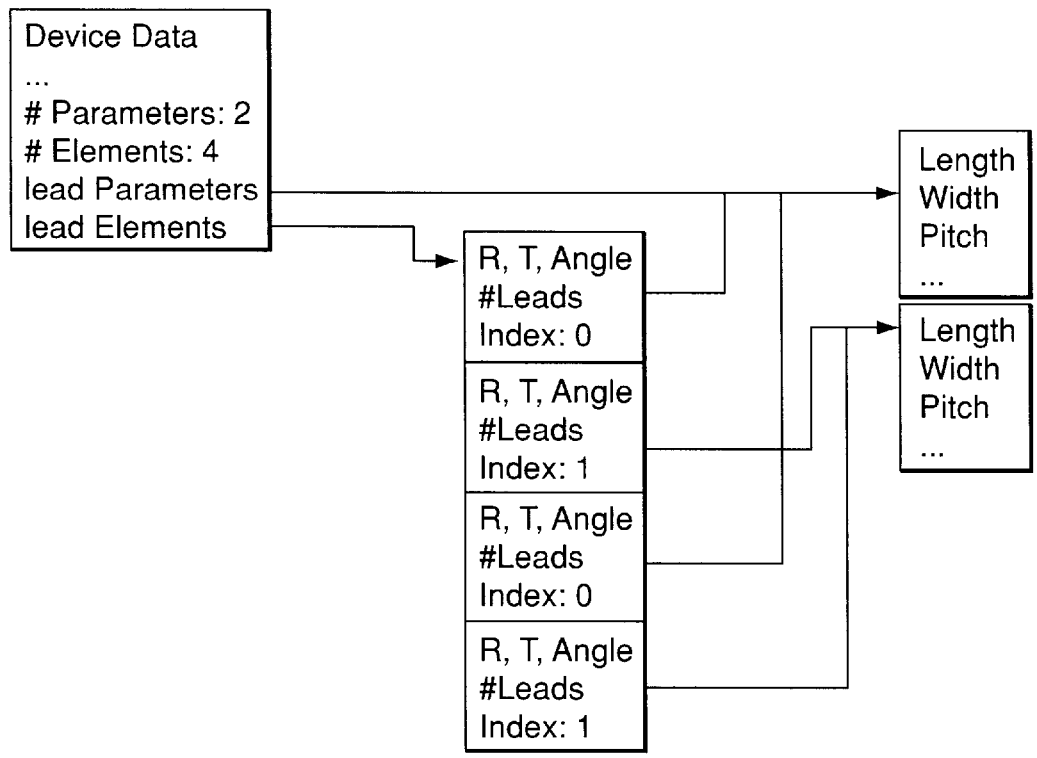
FIG. 4 depicts a device data structure.

In a preferred embodiment of the invention device description information is specified using a variable number of data items. The general structure of a device description is depicted in FIG. 4.

Figure 5:
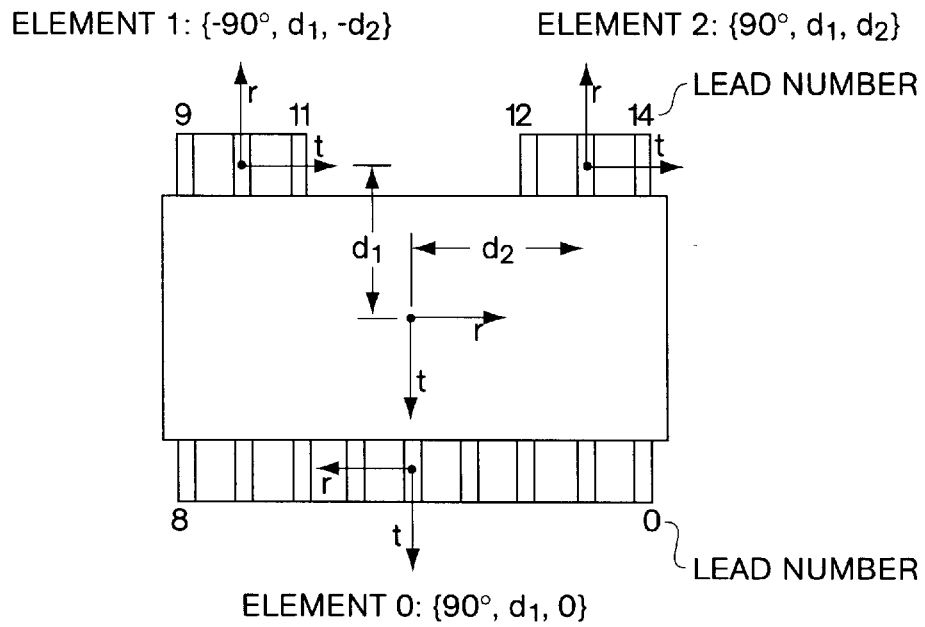
FIG. 5 depicts the use of polar coordinates to indicate lead parameters.

FIG. 5 illustrates a manner in which the method and apparatus of the present invention uses polar coordinates to define the location of lead elements with respect to the device coordinate frame.

Turning now to FIGS. 7, 8, and 9, the tables depicted therein define some of the device description parameters used by the current invention.

FIGS. 10, 11, 12 and 13 depict some of the items considered in the lead scan planning step of the lead scanning phase. In a preferred embodiment of the invention there are two types of lead scans: stepped and rotated, which are illustrated in FIG. 14.

Figure 14:
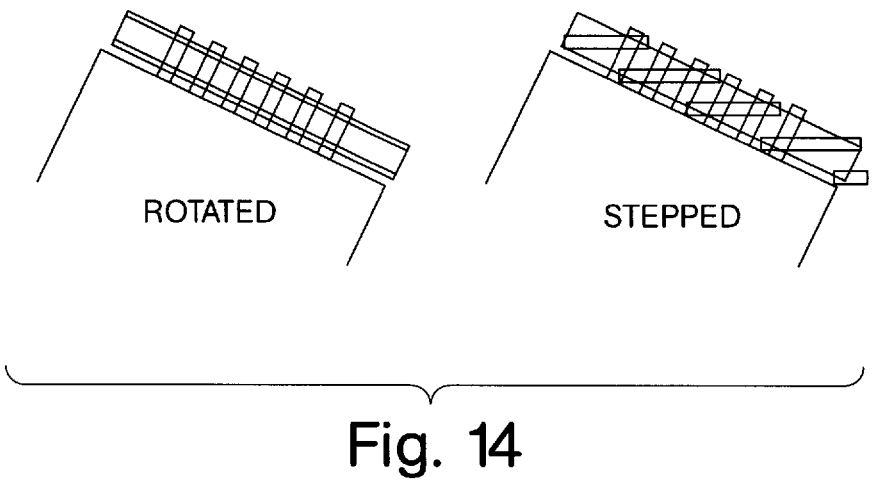
FIG. 14 shows two schematic top views of portions of digitized images of large leaded devices, one illustrating a narrow rotated scan and the other illustrating a stepped scan.

In FIG. 14, a stepped scan 40 consists of several calipers aligned with the image to cover the search rectangle This type of scan is very fast. Also shown in FIG. 14 is a rotated scan 45 which is slower but more reliable.

Note that the caliper locations and sizes are adjusted slightly from the planning to application steps so they align on integral pixel boundaries.

The edges from the calipers are then merged into a single edge list for the subsequent lead extraction phase. There are often extra spurious edges.

If the lead extraction phase found the expected number of leads in a lead set, the part position estimate is updated, based on the found lead positions. This is still a coarse estimate, but usually much better than the initial one. The updated position estimate makes subsequent lead set location operations more reliable and faster, by shrinking the search windows and rectangles, and locating closer to the ends of the lead sets.

According to the method and apparatus of the present invention, once a lead set has been located, the previous steps are now repeated for the next lead set until all have been found.

After all the leads have been successfully found, the locations are fit to the corresponding lead centerlines using a least-squares method. Any of a number of methods and techniques are know in the art to compute best fit.

A bent-lead check is then performed, checking the distance between each found lead and its corresponding centerline, to determine whether each lead is within the lead tangential tolerance.

In a preferred embodiment of the invention, data about a particular type of large leaded device can be supplied to the system by the use of a device description.

A device description is a collection of data that specifies a device's geometry. The device description is an additional aspect of the present invention. It is used to specify where the device features are located and the dimensions of these features. Such device features include the device body and its leads.

A device description can be used in accordance with the present invention in the following ways:

According to a preferred embodiment of the present invention, the device description is used during training to create all the data needed to successfully inspect a device. Also in a preferred embodiment of the invention, additional parameters can be included that are specific to the present invention.

Other portions of the machine vision system can use the device description to draw a model of the part on the display. The model can be drawn in various ways, for example to show minimum and maximum dimensions, or to show it at the nominal and inspected positions.

In a preferred embodiment of the invention, training is performed for each unique device type before that device is inspected.

According to a preferred embodiment of the present invention there are two types of training that can be performed:
1. High-level training in which the user supplies a standard device description and a few parameters. This is a preferred way to train.
2. Low-level training in which the user supplies the high-level parameters and a great many more low-level parameters. Low-level training is typically used under special circumstances described herein.

According to the method and apparatus of the present invention, a device description can be specified using a variable number of data items. The number of items depends on the number of lead sets in a device, and the number of different types of lead sets. The structure of a typical device description is illustrated in FIG. 4.

In a preferred embodiment of the invention, data pertaining to the device as a whole is kept in a single block of device data. There are, in addition, as can be seen in FIG. 4, blocks of parameter data and geometric data.

In a preferred embodiment of the invention, each distinct lead set has an associated geometric data block; this block is called an element. The element specifies the location and orientation of the lead set, how many leads it has, and what type of lead set it is. The type of lead set is specified by making reference to a parameter data block.

In a preferred embodiment of the invention, there can be as many parameter blocks as there are lead sets, or there can be only one. The parameter block contains information on the lead dimensions, pitch, and tolerances. As can be seen, any of a number of ways of representing and storing such data could be devised.

Referring again to FIG. 5, it can be seen how polar coordinates can be used to define the location of lead elements with respect to the device coordinate frame. FIG. 5 illustrates these coordinates for an example device. The location of a lead set is defined by the coordinates of the lead set coordinate frame with respect to the device coordinate frame. According to the method and apparatus of the present invention a user can place the device frame arbitrarily, but it is normally placed at the center of the device body, as shown in FIG. 5. The frame has an R (radial) axis 52 and a T (tangential axis) 54. The R axis corresponds to the X axis in a Cartesian coordinate frame. Therefore, a positive angle is defined as the direction that rotates the R axis into the T axis. The handedness, or relative position of the X and Y axes, of the device frame can also be specified by the user.

In a preferred embodiment of the invention, handedness is positive if this position is the same as for image coordinates (i.e. rotate X clockwise 90° to get to the Y axis); this is shown in FIG. 5. Handedness is negative if the positions are not the same; negative handedness differs from positive handedness by a 180° rotation of the Y axis.

In a preferred embodiment of the invention, a lead set frame is placed at the center of the group of leads. Its R axis points radially away from the device, and is aligned with the lead axis. The T axis therefore crosses the leads perpendicularly.

According to the method and apparatus of the present invention, the coordinates of a lead set location can be determined as follows. First, rotate the device frame until its R axis is aligned with the lead set's R axis. The rotation angle is the element angle coordinate. Next translate the rotated frame along its R and T axes so the frame's origin coincides with the lead set frame. The amounts translated are the R and T coordinates of the element. The location of the body is described in the same way. In a preferred embodiment of the invention, the body is assumed to be a rectangle; its coordinate frame is located at the center of that rectangle. For the normal case when the device frame is located at the body center, the body location {θ, R, T} is simply {0, 0, 0}.

Figure 6:
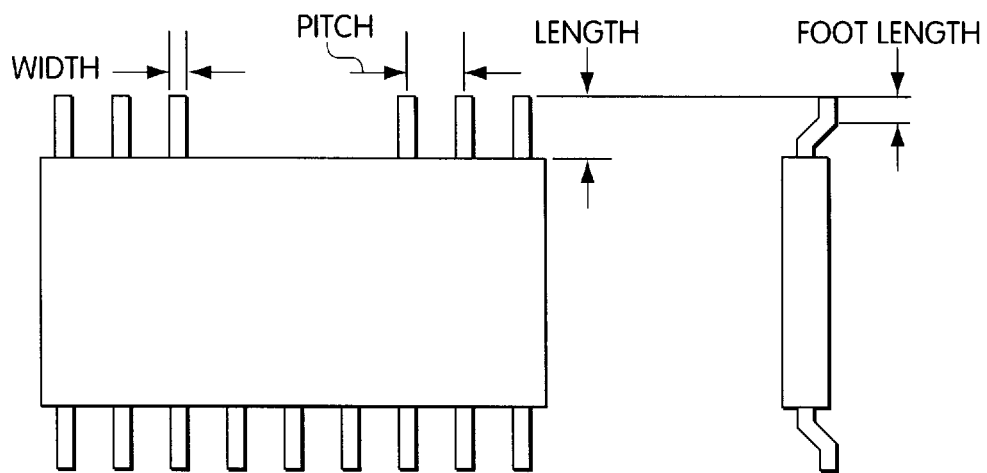
FIG. 6 shows an explanatory diagram illustrating the use of the terms width, pitch and foot length.

The dimensions in a lead set parameter block describe the geometry of each lead. All leads within a lead set are assumed to have the same geometry. FIG. 6 illustrates the dimensions given in the parameter block.

For illustration purposes, an explanation of each device parameter is provided in the tables contained in FIGS. 7, 8, and 9. In addition to the general device description information depicted in FIG. 7, a high-level description of the device includes a few additional parameters. These parameters are illustrated in FIG. 8.

In a preferred embodiment of the invention, low-level training provides an alternate, lower-level interface for specifying device and algorithm parameters. This low-level interface is more complex but provides more complete control. A user may want to use a low-level description if:
an existing inspection that was working properly has stopped working reliably. Typically the user may have diagnosed the problem and needs to adjust one or more parameter to fix the problem.
the user wants to inspect a part which does not have a defined part type in the high-level description. In this case, the user may find that doing such an inspection produced by using other part types does not work reliably.

In any of these cases, working at the low-level is typically used only when needed, and only temporarily. In a preferred embodiment of the invention, a new part type, once debugged at the low level, is added to the standard high-level library.

The low-level description shown in FIG. 9 usually consists of the high-level parameters, with some differences. First, in one embodiment of the present invention the part type is set to zero. This indicates that this is a low-level description and that extra parameters will be supplied.

Next, the description is augmented with extra low-level parameters. Illustrative low-level parameters are described in detail in the table shown in FIG. 9. The explanations include recommended values for the parameters. In most cases these values are those assigned by high-level device training. As can be seen, these recommended values can be changed based on new information and experience, and are included here for illustration purposes, and not by way of limitation.

In a preferred embodiment of the invention, a training step precomputes items that are derived from the device description parameters and used during the inspection phase.

In a preferred embodiment of the invention, training performs the following steps. If the device description uses a high-level (nonzero) part type, the remaining low-level algorithm parameters are calculated. The angular uncertainty is calculated from the bounding box margin size and device geometry. Memory for training data is allocated.

Lead parameter and lead set internal data is precomputed. This includes assigning all caliper parameters. Calipers are trained. The maximum required size is used for training, to minimize the time required to reinitialize a caliper after changing its size.

According to the method and apparatus of the present invention the bulk of the processing is involved with finding the leads in a lead set. In a preferred embodiment of the invention, top-level control is mainly concerned with achieving robustness through multiple attempts to find a lead set. It can be paraphrased by the pseudo-code shown in FIG. 16.

In a preferred embodiment of the invention, the steps included in finding the individual leads in a lead set can be summarized as follows:
1. Lead set locating, by finding gross edges and calculating the location and dimensions of the lead set search rectangle. This rectangle crosses all the leads in the lead set, at right angles.
2. Lead scanning. This step applies calipers within the search rectangle to find all the lead-side edges (not the edges at the lead tips).
3. Edge merging. If multiple calipers were applied in the search rectangle, the edges from each are merged into a single ordered list. The position of each edge is normalized to be in the same coordinates, regardless of which caliper it was found with.
4. Lead extraction. The merged edge list is examined to find pairs of edges which form leads. The device description parameters and edge polarity, separation, and contrast are all factors in extracting a lead from a pair of edges.

In a preferred embodiment of the invention, lead set location is used to find, roughly, two points at either end of the lead set. The center and angle of the search rectangle are computed from the centroid or average of the points, and the angle of the line connecting them.

Figure 10:
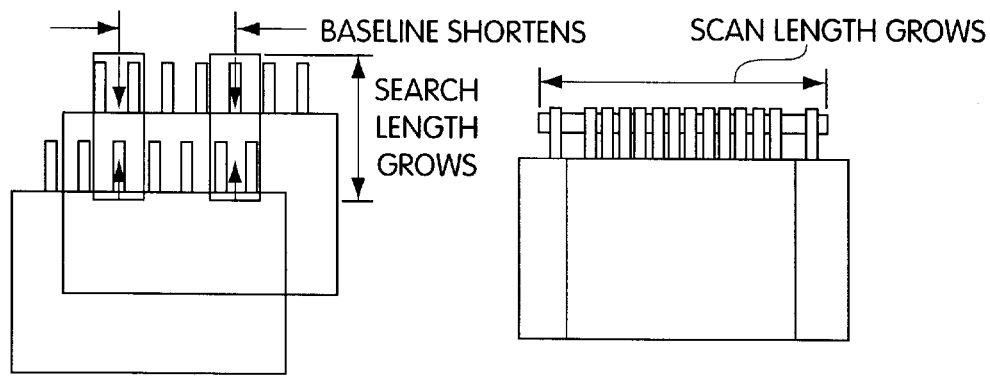
FIG. 10 shows portions of a digitized image of a large leaded device depicting uncertainty effects.
Figure 11:
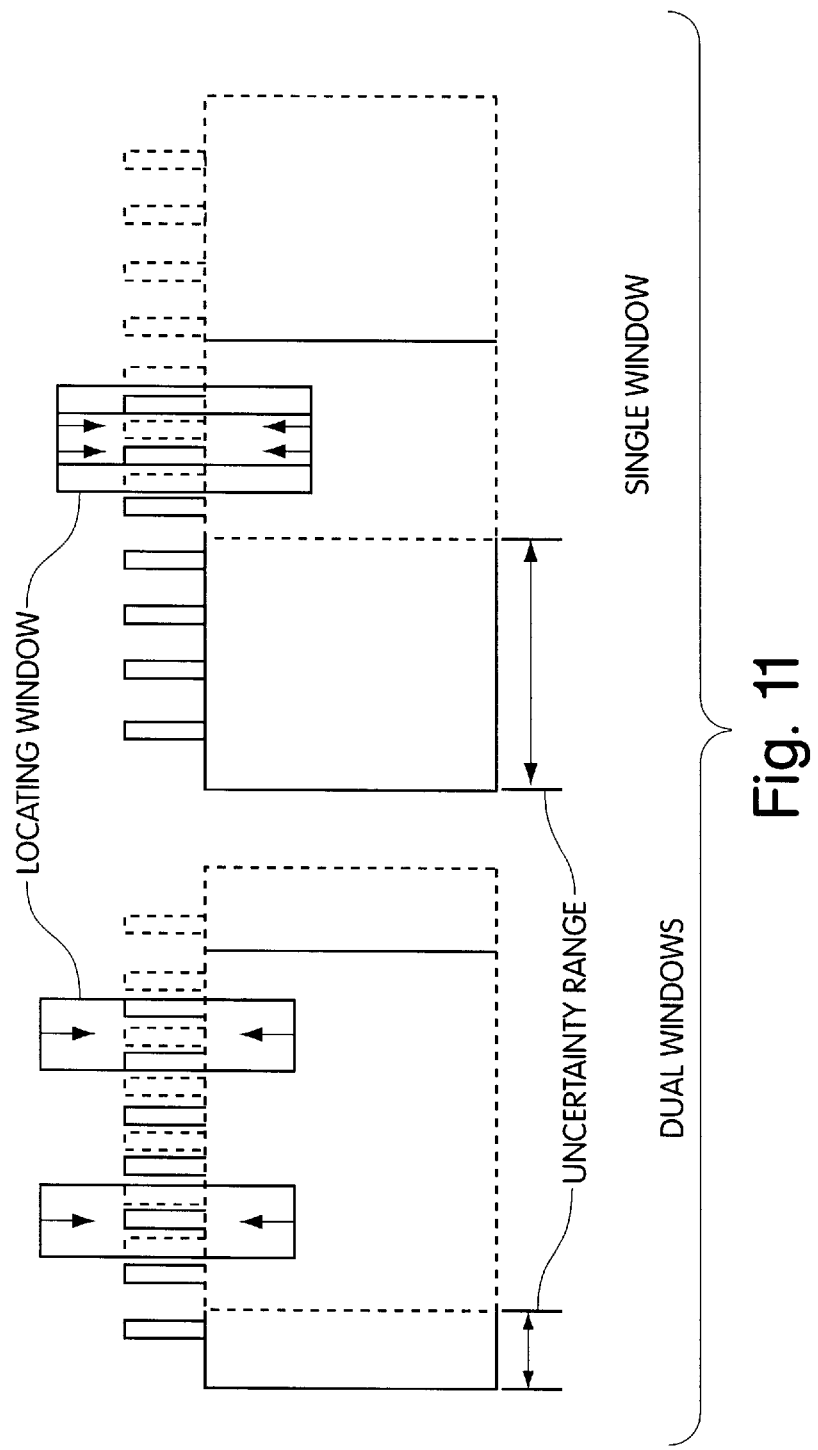
FIG. 11 shows portions of a digitized image of a large leaded device, illustrating search windows used in connection with uncertainty ranges.

Each endpoint of the lead set is located using a window that crosses that end. The uncertainty of the current part position estimate controls the placement and size of the search window. FIG. 10 and FIG. 11 illustrate the effect of uncertainty.

As can be seen from FIG. 10, as uncertainty grows the search length and scan length grow.

FIG. 11 depicts placement of locating windows under uncertain location conditions. In a preferred embodiment of the invention, the window axis is aligned with an image axis to improve speed of processing. As shown in FIG. 11, within a locating window 60, one or both of the lead tip and lead base edges are located.

Once the edges are located, a last step in lead set location includes computing the position and size of the lead scan search rectangle.

Figure 12:
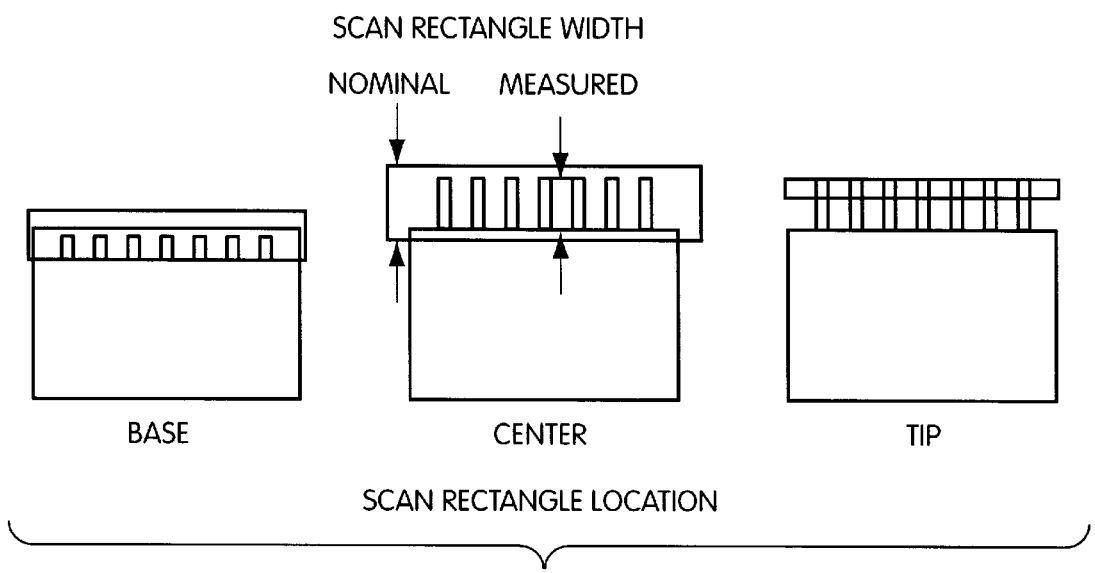
FIG. 12 depicts three digitized images of a large leaded device, illustrating three types of lead scan rectangle locations.
Figure 13:
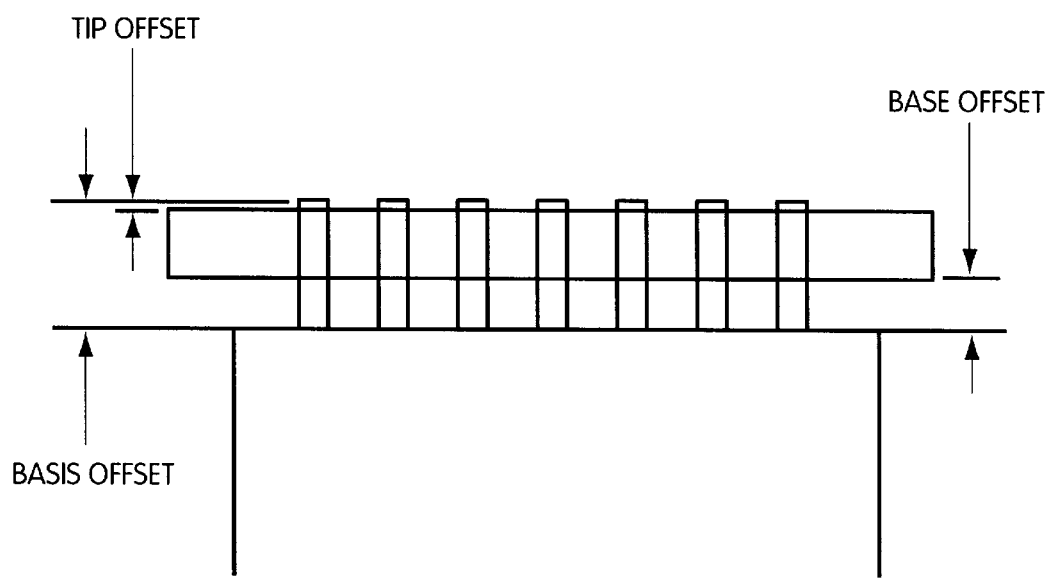
FIG. 13 depicts a digitized image of a large leaded device, illustrating tip offset, base offset and basis width.

These are used by the scan planning step. In a preferred embodiment of the invention, parameters can be used to control this placement and size. FIGS. 12 and 13 illustrate some of the considerations involved in this phase.

Referring to FIG. 13, the length of the lead scan search rectangle 70 can be determined only by the current part position uncertainty. The basis width 72 of the search rectangle can be selected to be the nominal width (equal to the minimum foot length device description parameter), the actual measured width (only possible if both edges are found), or the minimum of both. The nominal and measured widths are illustrated in FIG. 12.

According to the method and apparatus of the present invention, the unmodified, or basis, search rectangle can be aligned with the lead base, lead tip, or the two of the two. These options are illustrated in FIG. 12.

In a preferred embodiment of the invention, a final lead scan search rectangle is obtained from the basis rectangle by shrinking at both the lead tip and base. The amount of shrinkage is specified by the tip offset and base offset control parameters. The offsets are used to eliminate areas that should not be searched, for example to stay away from the lead tips, or to find only the part of the lead far from the body. This is illustrated in FIG. 13.

According to the method and apparatus of the present invention a caliper-based lead set location applies a caliper across the location window. This works well on backlit images and high-contrast frontlit images. It does not work very reliably in the following cases:

Front-lit image with low-contrast edges. These can occur when bright spots such as a worn nozzle appear behind the leads.

Greatly rotated parts. Parts with a large rotation have edges which are smeared by the caliper projection, leading to low-contrast edges or none at all.

Small lead features. These are encountered, for example, with PLCC parts in dim front light. The leads have bright spots at their centers which are very small relative to the lead pitch. These spots are swamped by the caliper projection, and often do not produce edges.

Several of the locating caliper parameters can be assigned using algorithm parameters, as detailed in FIG. 9.

In a preferred embodiment of the invention, an alternate lead set locating step performs a pixel intensity analysis in the locating window to find the lead tip and base. According to the method and apparatus of the present invention this approach is a first choice used for, but it is not restricted to frontlit images. In a preferred embodiment of the invention, these steps are performed:

Compute intensity threshold value for the window. Scan each line of pixels in the window from either end to find the first edges encountered. Use the minimum and maximum edges for all the lines a as the base and tip edges.

An edge, as defined according to the method and apparatus of the present invention, is the location of the first pixel in a run of a specified minimum number of consecutive pixels above a threshold. This minimum number is the noise filter length parameter, that can be specified in a low-level device description.

The width of the locating window can be specified by a locate window width algorithm parameter.

According to the method and apparatus of the present invention a threshold can be computed as follows:

Compute the expected area of the leads in the locating window. This equals the lead length times lead width, times the fractional number of leads expected in a window of the specified width. Multiply the expected area by the area fraction parameter. This is always less than one, and is meant to compensate for variation in apparent lead area due to lighting changes. The resulting area is converted to the number of expected lead pixels.

Calculate an intensity histogram of the image within the locating window.

Compute the intensity threshold that separates the expected lead pixels from the rest by the histogram tails processing method. Lower the intensity threshold by an intensity padding or pad parameter. This is used to compensate for the reduced lead area produced from the lead area fraction. Front-lit leads often have very uniform intensity across the lead. Lowering the threshold slightly tends to include the entire lead while still separating lead from background.

According to the method and apparatus of the present invention, lead scanning is the process of finding lead side-edges within the lead scan search rectangle, and pairing them to find individual lead positions. Note that the positions of the lead tips is never found, and the found position of the lead can be anywhere along its axis that is within the lead scan search rectangle.

In a preferred embodiment of the invention, lead edges are found by using calipers. There are two types of scans that are performed, as shown in FIG. 14.

As depicted in FIG. 14, the first of these is a rotated scan 45. This scan covers the lead scan search rectangle with a single, narrow rotated caliper. This type tends to be slower but more reliable at finding lead edges. In a preferred embodiment of the invention, there are two ways in which the caliper width can be determined:

for an initial caliper application (i.e. if a failure to locate has not yet occurred), the width is one-third the nominal search rectangle width, set by the minimum foot length.

for a retry application (after a failure to locate has occurred), this is set by the rotated scan caliper width parameter. Here, again, in a preferred embodiment of the invention there are two cases:

if the rotated scan caliper width parameter is positive, this specifies the caliper width.

if the rotated scan caliper width parameter is negative, it specifies the fraction of the search rectangle width to cover. The negative of the width is multiplied by the actual lead scan search rectangle width to obtain the caliper width. A number of other implementations will be apparent to those skilled in the art.

In a preferred embodiment of the invention, the alternative method used to perform the lead search scan includes the use of a stepped scan 40, as shown in FIG. 14. A series of calipers, each aligned with an image axis (i.e. non-rotated) is applied in such a way as to guarantee that each lead edge will appear in at least one caliper window. This type is much faster than the rotated caliper method. However, it does not work as well for parts with a large rotation, because the edges become smeared. It also becomes slower as the number of calipers increases.

In a preferred embodiment of the invention, which type of caliper coverage is to be used can be specified by the following parameters:

if the suppress first scan parameter is nonzero, then a rotated caliper using the width as computed for a retry scan is applied immediately. This is often a good choice if the lead scan search rectangle is very narrow and long. This may also be chosen for images with poor lighting and many spurious or low-contrast edges, or for parts with large angle uncertainty. In this case a user obtain increased robustness and slower inspection time.

the max scans parameter specifies the maximum number of calipers to apply to cover the search rectangle. If the number of calipers required exceeds this number, a rotated caliper (using the non-retry width computation) is used instead. Typically this number is exceeded when the part rotation becomes large. This number is often set so inspection time using the maximum number calipers is approximately the same as that using a single rotated caliper.

In addition, the contrast threshold for all scan calipers is specified by the scan contrast threshold parameter.

According to the method and apparatus of the present invention, the edge merging phase, is performed only when stepped scans produce multiple edge lists. In a preferred embodiment of the invention, the edge positions are projected along the lead axis, as estimated by the lead set angle produced by the lead set location step. If the projected positions of two edges from different scans are within a specified threshold value of each other, the edge having the stronger contrast is used and the other is ignored; otherwise both edges are included in the list.

According to the method and apparatus of the present invention, lead extraction analyzes a sorted list of edges to determine the position of each lead in the lead scan search rectangle. Each edge in the list typically has this information:

Position. The position is the distance from the start of the first scan, along the axis of the scan (i.e. caliper). For stepped scans, the scan axis is not the same as the lead set axis.

Contrast.

Polarity. A positive (+) contrast goes from dark to light, a minus (−) goes from light to dark.

In a preferred embodiment of the invention, at the top level, the lead extractor performs the following steps:

find a group of consecutive edges that might contain two lead edges. For most front-lit and low-contrast images, the group usually contains more than two edges.

find all edge pairings within the group that might constitute a lead. This is the set of lead candidates.

pick the candidate whose width (distance between edges) and pitch (distance to the previous lead) best matches the expected width and pitch. The expected width and pitch are adjusted to compensate for the difference between scan angle and lead set angle, if any. The lead location is projected onto the midline of the search rectangle and converted to physical coordinates.

continue the above steps until the entire edge list is processed.

if too many leads were found, execute a statistical lead rejection step to eliminate extra leads, if possible.

Figure 15:
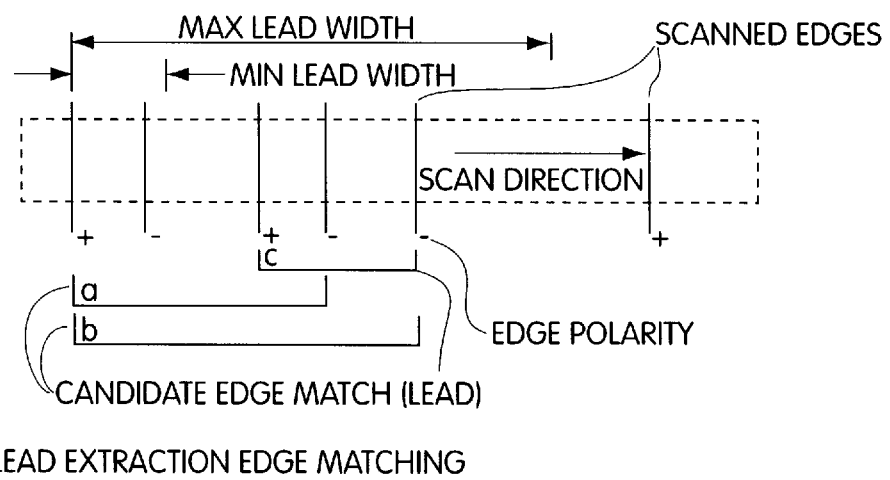
FIG. 15 shows schematic top view of portions of a digitized image of a large leaded device, illustrating some of the parameters used in lead extraction edge matching.

The first two steps above can be controlled by parameters, as illustrated in FIG. 15. First, edges must have the correct polarity to be considered. In the example in FIG. 15, a front-lit part is used, and so the starting edge must have a +polarity, the ending edge a −polarity. Frontlight or backlight inspection is specified by the backlit parameter.

The max lead width parameter specifies the distance that bounds a group of edges containing lead candidates. The group begins with the first edge having the starting polarity. The group distance is typically set to be slightly smaller than the lead pitch. This is to tolerate the case where the first edge in the group is not a lead edge. The min lead width specifies the minimum distance that a pair of edges must be from each other. This is typically derived from device data. It excludes spurious edges that occur close together or close to an actual lead edge.

According to the method and apparatus of the present invention, the lead edge candidates are evaluated by assigning each a grade. The grade is the sum of the deviations from expected width and pitch; a perfect grade is zero. Computing the width grade is straightforward. Computing the pitch grade is more complex. First, if the lead is the first one encountered, the pitch grade is set to zero. If possible, the distance of the lead to the preceding two leads is computed. The distance best matching the expected pitch is used, and the grade computed from that. If the best pitch of the best candidate is against the second preceding lead, the new candidate lead replaces the preceding lead; if not, it is appended to the lead list. This double-pitch check is used to eliminate leads which were mistakenly added to the list. This occurs particularly in PLCC parts, where molded-in features often form edges that can be interpreted as a lead. These spurious leads occur at half the actual lead pitch. The double pitch check removes these spurious leads. In a preferred embodiment of the invention, a statistical lead rejector rejects extra leads that occur at either end of the list of found leads. It cannot remove spurious leads that occur between correct ones. This is often all that's needed, since such spurious leads at the ends of sets are formed by edges on body corners, corner bumpers, and other molded features.

According to the method and apparatus of the present invention the he statistical lead rejector performs a number of steps. In a preferred embodiment of the invention, these include calculating or analyzing statistics about the leads.

The lead contrast is calculated as the average contrast of the two edges composing the lead. Lead width, the distance between the two edges and expected position, based on the assumption that the leads occur at regular intervals are two other data points used.

In a preferred embodiment of the invention, the basis for the lead statistics computations are as follows. In a hypothetical example, if there are 3 bad leads and 20 leads in set, the method uses the middle 14 leads as the basis for the computation of the statistics. Data from the end leads may not have properties that match normal leads at all, and thus could greatly corrupt the mean and standard deviation statistics of the lead set.

For illustrative purposes, to compile statistics on expected position, in a preferred embodiment of the invention the invention may look at the central 5 leads in the lead set. This yields 4 pitch distances (distances between leads) which are averaged. The 5 lead positions are also averaged to pick an "ideal" base position approximately at the middle lead. This is more reliable than simply using the middle lead position. The method and apparatus of a preferred embodiment the use the computed average pitch plus this base position to compute an expected position for each lead.

The standard deviation for lead contrast and width is computed. In a preferred embodiment of the invention, the standard deviation for position deviation can be arbitrarily assigned to be ⅙ of a lead pitch.

The "grade" for each lead is then computed as follows. The number of standard deviations (NSD's) for the lead's width, contrast, and position deviation is calculated. The grade is the sum of the NSD's, except that each component contributes only if it is at least one. Suppose a lead has a width that is 0.25 SD's from the mean width, a contrast that is 3.2 SD's from the mean contrast, and an expected position that is 0.92 SD's from its expected position. Its grade is 3.2. Removing low-NSD's from the grade keeps leads that are just "so-so", but really good, from looking as bad as a lead that is truly spurious. It favors (for rejection) leads that have one really bad characteristic over leads that have three mediocre characteristics.

Returning to the main steps of a preferred embodiment of the invention, after the first lead set is successfully found, the part position is updated and the uncertainty is lowered. This allows the remaining lead sets to be located faster and more reliably. In a preferred embodiment of the invention, the updated position estimate can be displayed graphically by turning on an appropriate diagnostic flag bit.

According to the method and apparatus of the present invention, there are several strategies that the top-level inspection routine uses to enhance robustness. These involve retrying a certain component of the inspection.

The first level of robustness is to retry a lead set location operation. The caliper-based algorithm may sometimes fail to find any pair of edges that match the expected parameters closely enough. The intensity-based algorithm may sometimes fail to find any feature. The locate algorithm parameter specifies a sequence of location algorithms to try for all lead set location steps. For front-lit parts, typically a user specifies the intensity-based approach first, then the caliper-based approach upon failure. A user could specify more approaches, repeat existing ones or add others as they become available.

In one embodiment of the present invention this first level of robustness handles only a minority of failures, however. The reason is that the locating operation typically finds the wrong feature far more often than no feature at all. The wrong feature leads to incorrect placement of the lead scan search rectangle, leading, usually, to a lead scan failure such as the wrong number of leads found. It is worthwhile retrying the entire lead set inspection process if a succeeding lead set was found successfully. This is because the part position was updated. The locating windows will now be placed in a different location, possibly avoiding the problematic feature found the first time. In addition, for caliper-based location, the skew angle will now be more correct, reducing edge smear in the projection step and producing sharper, cleaner edges.

After all the lead sets in the first pass have been found, the retry level is incremented. Now all uninspected lead sets are tried again, but this time the locating routine starts at the routine specified by the retry level (e.g. second routine for the first retry level).

After inspection is complete, and if the correct number of leads have been found for each lead set, the part is fitted to the model specified by the device description. The fit algorithm computes the rigid-body transform that minimizes the perpendicular distance between each found point and the corresponding line down the middle of the corresponding model lead. Any of a number of methods known in the art can be used to calculate fit. A special adjustment to the fit is required for parts with leads on only two sides. In this case, the fit cannot determine the part position along the direction of the lead axis. Lead set location information is used instead. The part location along this axis is adjusted by minimizing the maximum distance between observed and model lead set coordinate frames (i.e. search rectangles).

In a preferred embodiment of the invention, it can be determined if the device requires minimax adjustment during training, automatically.

If all leads were not found, the state of the inspection routine is examined to determine what failed. Because of the retry strategy, there may be several failures that actually occurred. The failure in the first uninspected lead set, as ordered by the device description, is the one that is reported. In one embodiment of the present invention the possible failures are:

missing lead. Fewer leads than expected were found in a lead set. This can be due to poor lighting or failure of lead set location to properly locate the search rectangle.

extra lead. More leads than expected were found in a lead set. This has the same causes as a missing lead. It can also be caused by an image background having regions brighter than the leads (frontlight inspection), or having many spurious high-contrast edges.

lead set location failure. One of the locating attempts (caliper or intensity) failed to find the required edges. For calipers, this means that no results were returned from a caliper application, i.e. no results that met the minimum grade were available. For intensity, this means that no line of pixels as long as the minimum filter length was found.

lead span failure, which occurs when the distance between the 2 endmost leads in a lead set exceeds a specified tolerance.

lead set location size failure. The separation between located edges was outside the tolerances specified by the Set Location Width parameters.

Other failures that do not regularly occur as the result of failed inspections are signaled. Note that all signals are caught by the top-level inspection routine, and the signal is placed in the error field of the reported results. This behavior can be overridden to allow signals and a full stack trace by setting the appropriate bit in the diagnostic flags field of the inspection parameters. The signaled failures include:

invalid state. The final lead set status is not set to "complete", or one of the expected failure states.

caliper off image. All calipers have their length adjusted at runtime to avoid intersecting the edges of the image. If the caliper requires width adjustment, or if it falls completely off the image, this adjustment will not work, and the caliper off image error is signaled.

no space. A fixed amount of space for edge and lead data is allocated during training time. More features were found during runtime than space is available for. This generally means that far too many features were found; the most likely cause is that the locating or scan contrast thresholds are too low. In a preferred embodiment of the invention, space is allocated in each scan (note that there are max scans number of scans per lead set) for 3 times as many edges, and 10 additional leads, as are expected from the device description.

If no failures were found, the part is fitted. After the fit, the following checks are performed to ensure that the part was successfully inspected:

T tolerance failure. A bent lead check is performed if the T tolerance parameter is greater than zero. To do this, the perpendicular distances between the observed leads and the model leads are computed. If any distance exceeds the tolerance value, a T tolerance failure is reported. This failure is most often triggered by a lead that is truly bent. The T tolerance value can also be unrealistically small. A rare failure is caused when one of the lead set inspections found the correct number of leads in an incorrectly-located search rectangle.

Those skilled in the art will appreciate that the embodiments described above are illustrative only, and that other systems in the spirit of the teachings herein fall within the scope of the invention.

What is claimed is:

1. In a machine vision system capable of capturing an optical image of a leaded part and digitizing said optical image as a two-dimensional image, a method for locating, inspecting, and placing leaded devices, comprising:

a) estimating an approximate location of a set of leads by locating at least one edge for a lead of a lead set by applying a region of interest window to said image containing a group of leads; projecting a two-dimensional image into a one-dimensional image; plotting edge values; applying an edge filter to locate each edge that may constitute a tip or a base; scoring the results of the filtering; selecting from the scoring of the filtering the positions that meet the expected values for a tip edge or a base edge;

b) computing the center and angle of a lead scan search rectangle within which leads in said set of leads must be located by computing two points at either end of a lead set and calculating the average of the points and the angle of a line connecting them;

c) scanning said lead scan search rectangle to locate lead edges and compile a list of edges by covering the search rectangle with a series of stepped calipers, each of said calipers aligned in a non-rotated manner with said image's axis and applied in such a way as to guarantee that each lead edge will appear in at least one caliper window and then projecting edge positions along the axis of said lead scan search rectangle, locating projected positions of two edges from different stepped calipers within a specified threshold of each other and selecting the edge with the stronger contrast to compile a single edge list;

d) extracting lead positions;

e) updating a part location estimate; and f) repeating steps a) through e) for each lead set to find all leads and lead centerlines.

2. The method of claim 1 wherein extracting lead positions further comprises:
   a) sorting a list of edges, wherein each edge is described by its position from the start of the first scan, its contrast level, and its contrast polarity, wherein positive contrast polarity goes from dark to light and negative contrast polarity goes from light to dark;
   b) finding a group of consecutive edges that might contain two lead edges;
   c) find all edge pairings within a group that might constitute a lead and generating a set of lead candidates;
   d) adjusting the expected lead width and lead pitch, in terms of the distance to the previous lead, to compensate for any difference between scan angle and lead set angle;
   e) picking the lead candidate whose width and pitch best matches the expected width and pitch of a model lead;
   f) projecting said candidate's lead location onto the midline of said lead scan search rectangle; and
   g) converting the lead location into physical coordinates; repeating steps a) through g) until the entire edge list is processed.

3. The method of claim 2 wherein the lead extraction step further comprises using control parameters to minimize errors.

4. The method of claim 3, wherein the step of using control parameters further comprises:
   assigning polarities to starting edges and ending edge descriptions to indicate front lighting or back lighting;
   assigning a maximum lead width parameter;
   assigning a minimum lead width parameter;
   calculating a grade for each lead candidate, wherein the grade is the sum of the deviations from expected width and pitch.

5. The method of claim 4, wherein the method of calculating a grade for pitch further comprises:
   a) computing the distance from a lead to a preceding lead or two leads, if they exist;
   b) selecting the distance best matching an expected pitch;
   c) if the best matching distance is not that from a lead to an immediately preceding lead, eliminate said preceding lead.

6. The method of claim 1 wherein inspecting leads further comprises:
   a) compiling statistics on designated properties of a lead set as a whole, heavily weighting the characteristics of leads found in the middle;
   b) assigning each lead in a lead set a grade indicating its typically compared to said set as a whole;
   c) computing a histogram of the grades of a set;
   d) analyzing the histogram;
   e) calculating the number of extraneous leads (n)found in a set;
   f) selecting from said histogram values, those extraneous leads n, with the worst scores;
   g) verifying that the n worst grades are significantly worse than the grades of the rest of the leads;
   h) verifying that these n worst graded leads are also at the ends of a lead set; and
   i) rejecting said n worst leads.

7. The method of claim 6 wherein compiling statistics further comprises:
   a) subtracting twice the number of extraneous leads from the total number of expected leads, yielding a number of remaining leads in the middle of said lead set;
   b) calculating lead contrasts from the said remaining leads as the average contrast of two edges comprising the lead;
   c) calculating lead width for said remaining leads;
   d) computing the average pitch of at least two and at most an upper threshold m of the middle leads found;
   e) calculating an ideal base position for a first lead by calculating the average position of the central m leads; correcting this by subtracting the average pitch times half of one less than the number of leads;
   f) computing an expected position for each lead by using the computed average pitch and the ideal base position, so that said ideal base position is equal to lead number—where a first lead is numbered zero— multiplied by average pitch;
   g) computing the standard deviation for lead contrast and width for each of the leads being analyzed;
   h) calculating the number of standard deviations from average for each of said leads' width, each of said leads' contrast and each of said leads' position's deviation from expected position; and
   i) calculating a grade for each lead being analyzed by summing each of the standard deviations computed for it in step h that are greater than a specified threshold value.

8. In a machine vision system capable of capturing an optical image of a leaded part and digitizing said optical image as a two-dimensional image, an apparatus for locating, inspecting and placing leaded devices, comprising:
   a) a means for estimating an approximate location of a set of leads by locating at least one edge for a lead of a lead set by applying a region of interest window to said image containing a group of leads; projecting a two-dimensional image into a one dimensional image; plotting edge values; applying an edge filter to locate each edge that may constitute a tip or a base; scoring the results of the filtering; selecting from the scoring of the filtering the positions that meet the expected values for a tip edge or a base edge;
   b) means for computing the center and angle of a lead scan search rectangle within which leads in said set of leads must be located by computing two points at either end of a lead set and calculating the average of the points and the angle of a line connecting them;
   c) means for scanning said lead scan search rectangle to locate lead edges and compile a list of edges by covering the search rectangle with a series of stepped calipers, each of said calipers aligned in a non-rotated manner with said image's axis and applied in such a way as to guarantee that each lead edge will appear in at least one caliper window, the means for scanning also communicating with a means for projecting edge positions along the axis of said lead scan search rectangle, and a means for locating projected positions of two edges from different stepped calipers within a specified threshold of each other and a means for selecting the edge with the stronger contrast to compile a single edge list;
   d) means for extracting lead positions;
   e) means for updating a part location estimate; and
   f) means for iterating through each lead set to find all leads and lead centerlines.

9. The apparatus of claim 8 wherein the means for extracting lead positions further comprises:
   a) a means for sorting a list of edges, wherein each edge is described by its position from the start of a first scan, its contrast level, and its contrast polarity, wherein positive contrast polarity goes from dark to light and negative contrast polarity goes from light to dark;

b) a means for finding a group of consecutive edges that might contain two lead edges;

c) a means for finding all edge pairings within a group that might constitute a lead to generate a set of lead candidates;

d) a means for adjusting the expected lead width and lead pitch, in terms of the distance to the previous lead, to compensate for any difference between scan angle and lead set angle;

e) a means for picking a lead candidate whose width and pitch best matches the expected width and pitch of a model lead;

f) a means for projecting the candidate's lead location onto the midline of the search rectangle; and g) a means for converting the candidate's lead location into physical coordinates; and a means for repeating items a) through g) until the entire edge list is processed.

10. The apparatus of claim 9 wherein the means extracting lead positions further comprises a means for using control parameters to minimize errors.

11. The apparatus of claim 10 wherein the means for calculating a grade for pitch further comprises:

a) a means for computing the distance from a lead to a preceding lead or two leads, if they exist;

b) a means for selecting the distance best matching an expected pitch;

c) if the best matching distance is not that from a lead to an immediately preceding lead, a means to eliminate said preceding lead.

12. The apparatus of claim 8 further comprising:

a) a means for compiling statistics on the properties of a lead group as a whole, heavily weighting the characteristics of leads found in the middle;

b) a means for assigning each lead in a group a grade indicating its typicality compared to said group as a whole;

c) a means for computing a histogram of the grades of a group;

d) a means for analyzing the histogram;

e) a means for calculating the number of extraneous leads (n) found in a group;

f) a means for selecting from said histogram values, those extraneous leads n with the worst scores;

g) a means for verifying that the n worst grades are significantly worse than the grades of the rest of the leads;

h) a means for verifying that these n worst graded leads arc also at the ends of a lead set; and i) a means for rejecting said n worst leads.

13. In a machine vision system capable of capturing an optical image of a part and digitizing said optical image, to enable the locating, inspecting and placing of leaded devices, a method for statistically rejecting spurious leads comprising:

a) compiling statistics on the properties of a lead group as a whole, heavily weighting the characteristics of leads found in the middle;

b) assigning each lead in a group a grade indicating its typicality compared to said group as a whole;

c) computing a histogram of the grades of a group;

d) analyzing the histogram;

e) calculating the number of extraneous leads (n) found in a group;

f) selecting from said histogram values, those extraneous leads n with the worst scores;

g) verifying that the n worst grades are significantly worse than the grades of the rest of the leads;

h) verifying that these n worst graded leads are also at the ends of a lead set; and i) rejecting said n worst leads.

14. The method of claim 13 wherein compiling statistics further comprises:

a) subtracting twice the number of extraneous leads from the total number of expected leads;

b) calculating lead contrasts from the remaining leads in the middle as the average contrast of two edges comprising the lead;

c) calculating lead width for said remaining leads;

d) computing the average pitch of at least two and at most an upper threshold m of the middle leads found;

e) calculating an ideal base position for a first lead by calculating the average position of the central m leads; correcting this by subtracting the average pitch times half of one less than the number of leads;

f) computing an expected position for each lead by using the computed-average pitch and the ideal base position, so that said ideal base position is equal to the lead number—where a first lead is numbered zero—multiplied by the average pitch;

g) computing the standard deviation for lead contrast and width for each of the leads being analyzed;

h) calculating the number of standard deviations from average for each of said lead's width, each of said lead's contrast and each of said lead's position deviation from expected position; and i) calculating a grade for each lead being analyzed by summing each of the standard deviations.

* * * * *